(No Model.)
F. E. YOUNGS.
PIPE COUPLING.
No. 327,215. Patented Sept. 29, 1885.
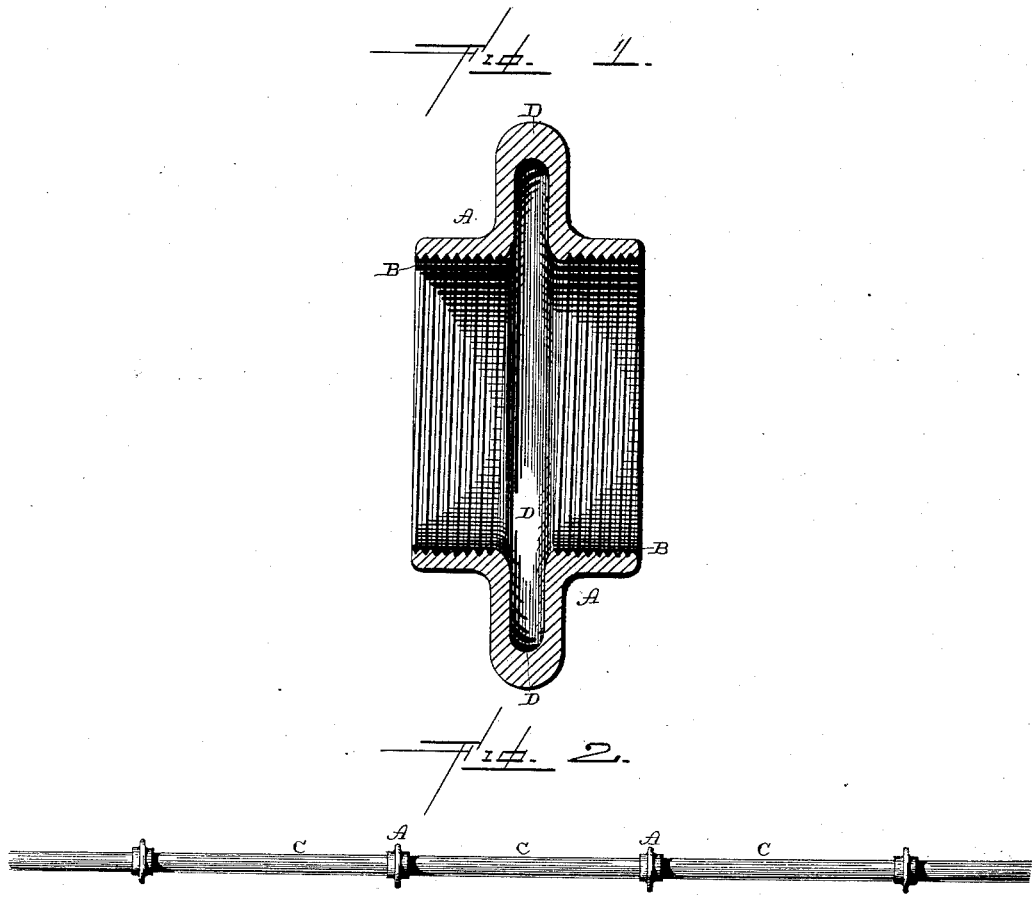

UNITED STATES PATENT OFFICE.

FRED. E. YOUNGS, OF ALLEGHENY, PENNSYLVANIA.

PIPE-COUPLING.

SPECIFICATION forming part of Letters Patent No. 327,215, dated September 29, 1885

Application filed June 1, 1885. (No model.)

*To all whom it may concern:*

Be it known that I, FRED. E. YOUNGS, of Allegheny, in the county of Allegheny and State of Pennsylvania, have invented certain new and useful Improvements in Pipe-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in pipe-couplings; and it consists in a coupling which is formed from a single piece of elastic metal, and which has a screw-thread at each end, and an annular groove at its center midway between the threads, the walls of the groove being made nearly parallel, and having sufficient strength to withstand the twisting strain of screwing the ends of the pipes into it, and having sufficient elasticity to accommodate the expansion and contraction of the pipes which form the main, all of which will be more fully described hereinafter.

The object of my invention is to provide an elastic coupling for metal pipes which conduct fluids of different kinds, and which couplings are sufficiently elastic to allow the pipes to expand and contract with the different changes of temperature without any liability of either destroying the coupling by stripping off the threads or to loosen the joint in such a manner that gas or other fluids will leak through.

Figure 1 is a vertical section of a socket embodying my invention. Fig. 2 shows a portion of a line of pipes to which my coupling is applied.

A represents the coupling, which is made from a single piece of metal which has sufficient elasticity to answer the purpose required, and which coupling is provided with a screw-thread, B, at each end, for the purpose of allowing the end of a pipe, C, to be screwed into it.

At the center of each coupling is formed the internal groove, D, of any desired depth. The walls of this groove are made parallel, or nearly so, so as to give them the greatest amount of elasticity, and which walls are made sufficiently strong and heavy to stand all strain incurred by screwing the pipes into the ends of the socket, and also heavy enough to stand any pressure of fluid that the pipes themselves will stand. The metal out of which this coupling A is formed having sufficient elasticity to allow the walls of the groove to give, allows the pipes which form the main to expand and contract from the changes of temperature without any danger of stripping off the threads from the coupling or pipes or injuring the joint in such a manner as to allow the fluid to leak.

In carrying natural gas through pipes under pressure greater difficulties are encountered than in carrying any other fluid, because its specific gravity is so light, and its nature so penetrating that it has been found necessary to use the strongest wrought-iron pipes provided with the heaviest screw-fittings and sockets, thus giving sufficient strength to the fittings to allow the pipes to be screwed together with all the force possible to be brought to bear upon them, the object being to make the joint between the screw-threaded coupling and the threads on the ends of the pipes perfectly gas-tight. Flanged unions and joints carrying packings of any kind have been abandoned, because they cannot be made tight and reliable, and even screw-threads are not entirely reliable for many reasons.

Pipes laid underground for conducting natural gas and fluids of different kinds are subjected all the year round to variations in temperature, and these variations cause the pipes to expand and contract, and if there is not some expansible means placed at suitable intervals apart in the pipes the threads in the couplings are injured to such an extent that the gas freely escapes. In order to meet these variations in temperature, and the corresponding expansion and contraction in the pipes, each coupling is made sufficiently elastic to accommodate the expansion and contraction of a single length of a pipe, and each coupling is made sufficiently strong and heavy to stand the enormous twisting strain to which screw-sockets are subjected in screwing the pipes into them, and also the heavy pressure used in conveying natural gas; and thus I am enabled to do away with all forms of variators, stuffing-boxes, and flanged unions, still keeping the heavy screw form of fittings, which is found to be the most reliable for this purpose.

Having thus described my invention, I claim—

1. A screw socket or coupling provided with screw-threaded ends and an internal annular groove, the walls of which have sufficient elasticity to accommodate the expansion and contraction of a single length of pipe, and sufficient strength to withstand the twisting strain of screwing the ends of the pipes inside of it, substantially as shown.

2. In a line of screw-threaded pipes, the combination, with each length of pipe, of an elastic screw-threaded socket or joint having sufficient elasticity to allow that length of pipe to contract and expand, substantially as described.

3. As a new article of manufacture, a single length of screw-threaded pipe provided with an elastic screw-threaded socket, substantially as and for the purpose specified.

In testimony whereof I affix my signature in presence of two witnesses.

FRED. E. YOUNGS.

Witnesses:
J. A. EMERY,
H. H. SALLADE.